US011611566B2

(12) United States Patent
Beckett et al.

(10) Patent No.: US 11,611,566 B2
(45) Date of Patent: Mar. 21, 2023

(54) AUTOMATIC VERIFICATION OF SAFETY FOR VIRTUALIZED NETWORKS

(71) Applicant: Microsoft Technology Licensing, LLC, Redmond, WA (US)

(72) Inventors: Ryan Andrew Beckett, Redmond, WA (US); Sharad Agarwal, Seattle, WA (US); Paramvir Bahl, Bellevue, WA (US); Rachee Singh, Redmond, WA (US); Abhishek Udupa, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/359,241

(22) Filed: Jun. 25, 2021

(65) Prior Publication Data

US 2022/0417102 A1 Dec. 29, 2022

(51) Int. Cl.
*H04L 9/40* (2022.01)
*H04L 41/0896* (2022.01)
(Continued)

(52) U.S. Cl.
CPC ........ *H04L 63/107* (2013.01); *H04L 12/2869* (2013.01); *H04L 41/0893* (2013.01);
(Continued)

(58) Field of Classification Search
CPC ..... H04L 63/107; H04L 63/10; H04L 63/205; H04L 63/20; H04L 63/105;
(Continued)

(56) References Cited

U.S. PATENT DOCUMENTS 10,834,141 B1 * 11/2020 Chud .................... H04L 63/107
2019/0103991 A1    4/2019 Cidon et al.
(Continued)

FOREIGN PATENT DOCUMENTS

EP        3522452 A1    8/2019

OTHER PUBLICATIONS

"International Search Report and Written Opinion Issued in PCT Application No. PCT/US22/029939", dated Sep. 6, 2022, 11 Pages.

*Primary Examiner* — Kyung H Shin
(74) *Attorney, Agent, or Firm* — ArentFox Schiff LLP

(57) ABSTRACT

Described are examples for providing a system for managing configuration and policies for a virtualized wide area network (vWAN) support on a wide area network (WAN). The vWAN includes a plurality of virtual network entities associated with geographic locations including the physical computing resources of the WAN and virtual connections between the virtual network entities. The system includes a network safety component for managing configurations and policies of the vWAN on the WAN. The network safety component receives a change to a policy or configuration of the vWAN from an operator of a network connected to the vWAN. The network safety component evaluates a set of safety rules for the operator based on the change and a network state of a physical WAN underlying the vWAN. The network safety component generates an error message in response to at least one of the set of safety rules failing the evaluation.

18 Claims, 5 Drawing Sheets

(51) Int. Cl.
*H04L 41/0893* (2022.01)
*H04L 12/28* (2006.01)
*H04L 43/10* (2022.01)

(52) U.S. Cl.
CPC .......... *H04L 41/0896* (2013.01); *H04L 43/10* (2013.01); *H04L 63/0263* (2013.01); *H04L 63/20* (2013.01)

(58) Field of Classification Search
CPC . H04L 63/0263; H04L 41/0893; H04L 43/10; H04L 43/0852; H04L 43/12; H04L 47/2408; H04L 45/028; H04L 41/14; H04L 45/04; G06F 21/6218; G06F 16/2453
See application file for complete search history.

(56) References Cited

U.S. PATENT DOCUMENTS

| | | | |
|---|---|---|---|
| 2020/0314145 A1 | 10/2020 | Bolignano et al. | |
| 2021/0119970 A1* | 4/2021 | Raphael | H04L 63/0263 |
| 2022/0029906 A1* | 1/2022 | Mahesh | H04L 43/10 |

* cited by examiner

AUTOMATIC VERIFICATION OF SAFETY FOR VIRTUALIZED NETWORKS

BACKGROUND

Wide area networks may include computing resources spread across a geographic region and connected via communication links such as fiber optic cables. The size of wide area networks may vary greatly from a small city to a global network. For example, a WAN may connect multiple offices of an enterprise, the customers of a regional telecommunications operator, or a global enterprise. The computing resources and connections within a WAN may be owned and controlled by the WAN operator.

In some scenarios, a WAN operator may want to expand the reach of the WAN, for example, to connect to an area where the WAN operator does not have physical resources. A virtual WAN (vWAN) may be a service provided by a vWAN operator (e.g., the operator of a larger WAN), that allows smaller WAN operators to share the computing resources and connections of the larger WAN. The vWAN operator may make service level agreements (SLAs) with the WAN operator to provide various computing and network services. For example, the vWAN operator may agree to host an application at one or more geographic locations, provide connectivity to the application via the Internet, and provide connectivity between the geographic locations with guaranteed metrics. In existing vWANs, the WAN operator may have little control over the underlying network of the vWAN operator. For example, the WAN operator may not control routing decisions within the vWAN.

A network operator may be subject to various laws, regulations, and policies that govern network operation. One concern with using a vWAN is that the WAN operator may unknowingly violate a law, regulation, or policy. For example, a government regulation that is applicable to the WAN operator may govern export of data. For instance, the regulation may specify that certain types of data may only be exported to countries that comply with certain standards. Similar policies may be requested by users of the WAN. A vWAN may provide the network operator with the ability to configure various aspects and policies within the vWAN. The network operator may unintentionally cause a change that violates a law, regulation, or policy. Accordingly, it may be desirable for a vWAN to provide checks on network operator configuration of a vWAN.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, an apparatus for managing policies for a virtualized wide area network (vWAN) is provided. The apparatus includes a memory storing one or more instructions for managing the vWAN and at least one processor coupled to the memory and configured to execute the instructions. The vWAN includes a plurality of virtual network entities associated with geographic locations and virtual connections between the virtual network entities. The at least one processor is configured to receive a change to a policy and a configuration of the vWAN from an operator of a network connected to the vWAN. The at least one processor is configured to evaluate a set of safety rules for the operator based on the change and a network state of a physical WAN underlying the vWAN to determine whether conditions of the safety rules can be satisfied given the policy, the configuration, and the network state. The at least one processor is configured to generate an error message in response to at least one of the set of safety rules failing the evaluation.

In another example, a method of managing policies for a vWAN is provided. The method may include receiving a change to a policy and a configuration of the vWAN from an operator of a network connected to the vWAN. The vWAN includes a plurality of virtual network entities associated with geographic locations and virtual connections between the virtual network entities. The method includes evaluating a set of safety rules for the operator based on the change and a network state of a physical WAN underlying the vWAN to determine whether conditions of the safety rules can be satisfied given the policy, the configuration, and the network state. The method includes generating an error message in response to at least one of the set of safety rules failing the evaluation.

In another example, a system for managing configuration and policies for a vWAN is provided. The system includes a wide area network (WAN) including a plurality of geographically distributed physical computing resources and connections there between. The system includes a network orchestrator including a memory storing one or more parameters or instructions for managing the vWAN on the WAN and at least one processor coupled to the memory. The vWAN includes a plurality of virtual network entities associated with geographic locations including the physical computing resources and virtual connections between the virtual network entities. The at least one processor is configured to receive a change to a policy and a configuration of the vWAN from an operator of a network connected to the vWAN. The at least one processor is configured to evaluate a set of safety rules for the operator based on the change and a network state of the WAN underlying the vWAN to determine whether conditions of the safety rules can be satisfied given the policy, the configuration, and the network state. The at least one processor is configured to generate an error message in response to at least one of the set of safety rules failing the evaluation.

In some implementations, the at least one processor is configured to block the change in response to at least one of the set of safety rules failing the evaluation.

In some implementations, the policy or configuration is a match action rule.

In some implementations, the at least one processor is configured to: detect a change in the network state of the physical WAN underlying the vWAN; and evaluate the set of safety rules for the operator based on the policy and configuration for the operator and the network state in response to detecting the change in the network state.

In some implementations, the set of safety rules includes a reachability rule defining whether a first point in the vWAN can reach a second point in the vWAN.

In some implementations, the set of safety rules includes a negative reachability rule that prevents traffic originating in a first geographic location from entering a second geographic location.

In some implementations, the set of safety rules includes a capacity rule defining whether the physical WAN underlying the vWAN can support the policy and configuration of the vWAN. Evaluating the capacity rule may include evaluating the capacity rule for the operator in view of other vWANs sharing the physical WAN.

In some implementations, the set of safety rules include a first set of rules defining compliance with government regulations and a second set of rules defining operator selected rules.

In some implementations, the at least one processor is configured to receive a selection of the set of safety rules from the network operator.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
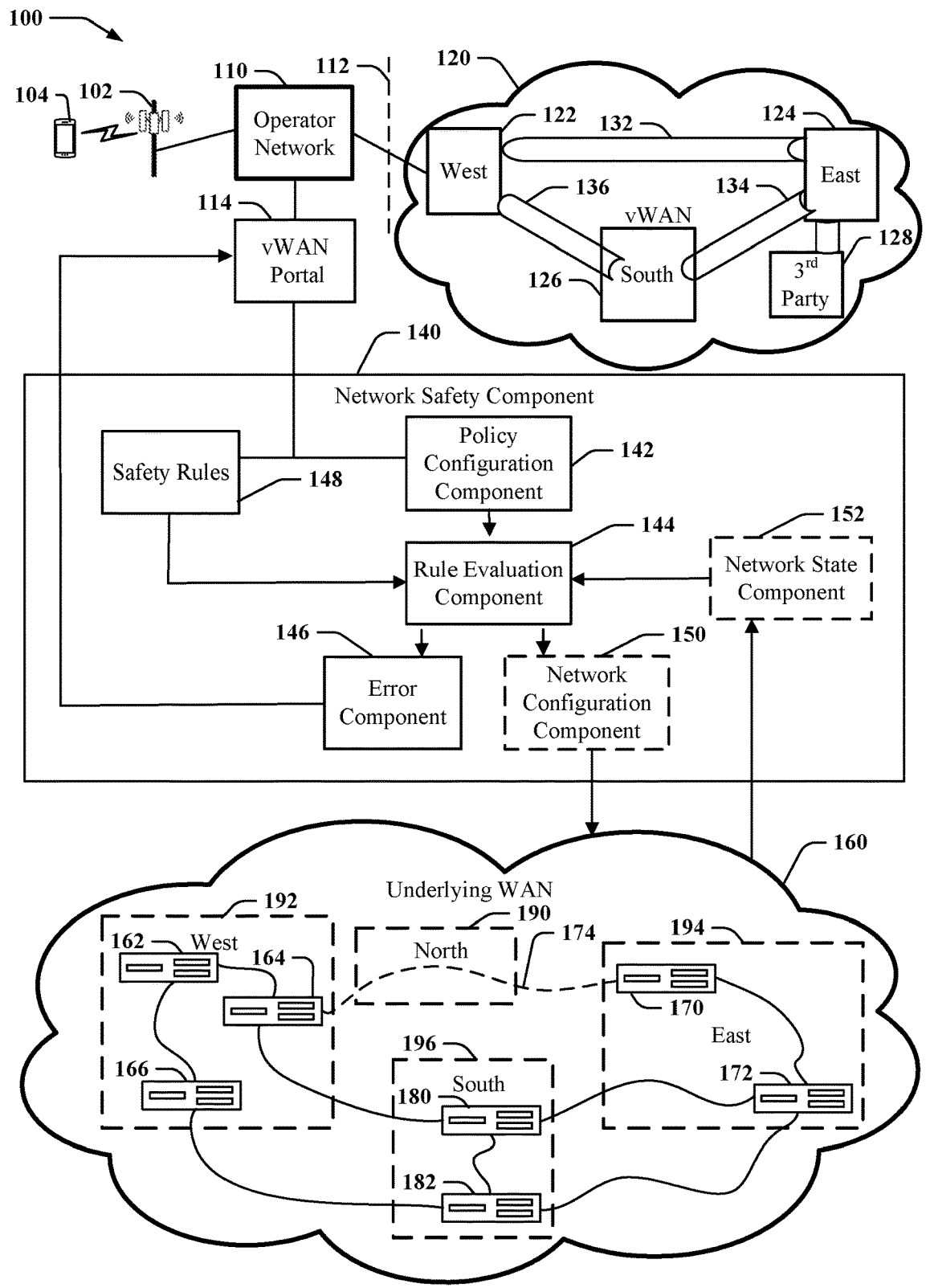
FIG. 1 is a diagram of an example of an architecture for a virtualized wide area network (vWAN), in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to enforcement of safety rules in a virtualized network such a virtualized wide area network (vWAN). A vWAN may be a service provided by an operator of a wide area network (WAN), typically a WAN with a relatively large geographic footprint. Another network operator may connect an operator network to the vWAN to extend the operator network either geographically or functionally. For example, the vWAN may allow an operator network to expand to a new geographic location or connect two remote locations. As another example, the vWAN may host services of the operator, the vWAN operator, or the $3^{rd}$ parties that may be provided to users of the operator network.

In an aspect, a vWAN operator provides a vWAN portal to the network operator for configuration of the vWAN. For example, the network operator may be a customer of the vWAN. The vWAN portal allows the network operator to configure various virtual network entities and policies within the vWAN. The vWAN portal may provide a representation of the vWAN including virtual network entities associated with respective geographic locations and virtual connections between the virtual network entities. The representation may be an abstraction of an underlying WAN controlled by the vWAN operator. The representation of the vWAN may allow the vWAN operator to expose some aspects of the underlying WAN architecture that may be useful for the network operator to set policies. The representation of the vWAN, however, may hide details regarding physical resources. Accordingly, the vWAN operator may modify the underlying WAN without changing the representation of the vWAN.

In an aspect, the present application provides a network safety component configured to enforce a set of safety rules when a network operator makes changes to a vWAN configuration or policy. The safety rules may be specified at a relatively higher level for multiple virtual network entities or the entire vWAN. The configuration and policies may be specified at a relatively lower level for individual virtual network entities or virtual connections.

The network safety component may receive a configuration and/or policies from the network operator via the vWAN portal and the representation of the vWAN. The network safety component may be configured with a set of safety rules that ensure compliance with higher level laws, regulations, or policies. For example, a law may specify that a class of traffic is not to enter a certain geographical region. The change in configuration or policy may, for example, change routing rules at a virtual network entity to select a faster or cheaper route. The network safety component may check whether the change to the configuration or policy would result in a change that violates the law. For instance, the network safety component may check that each of the nodes along a new path based on the new configuration or policy is not within the specified geographic region.

Figure 2:
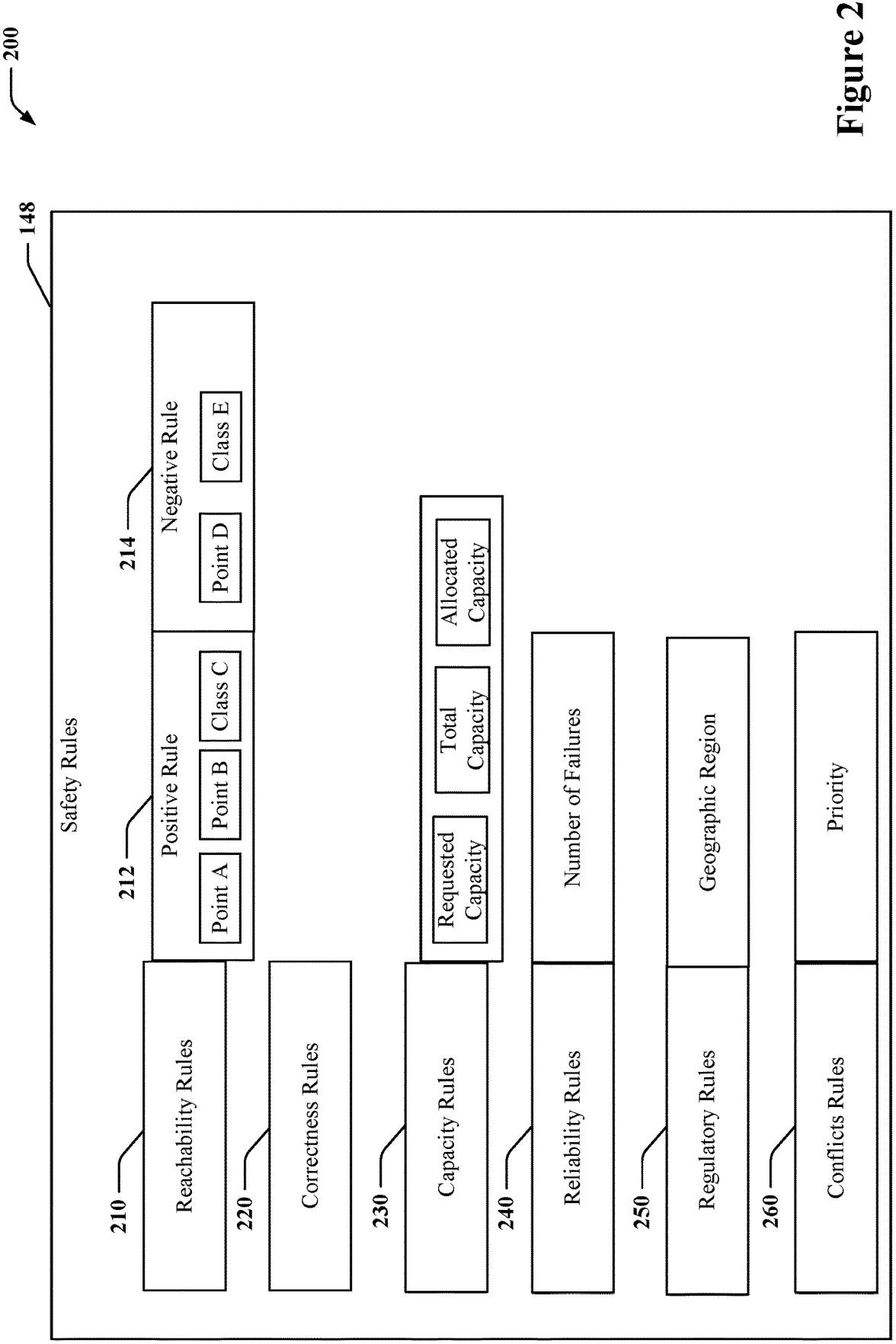
FIG. 2 is a diagram of an example set of safety rules for a vWAN, in accordance with aspects described herein.
Figure 3:
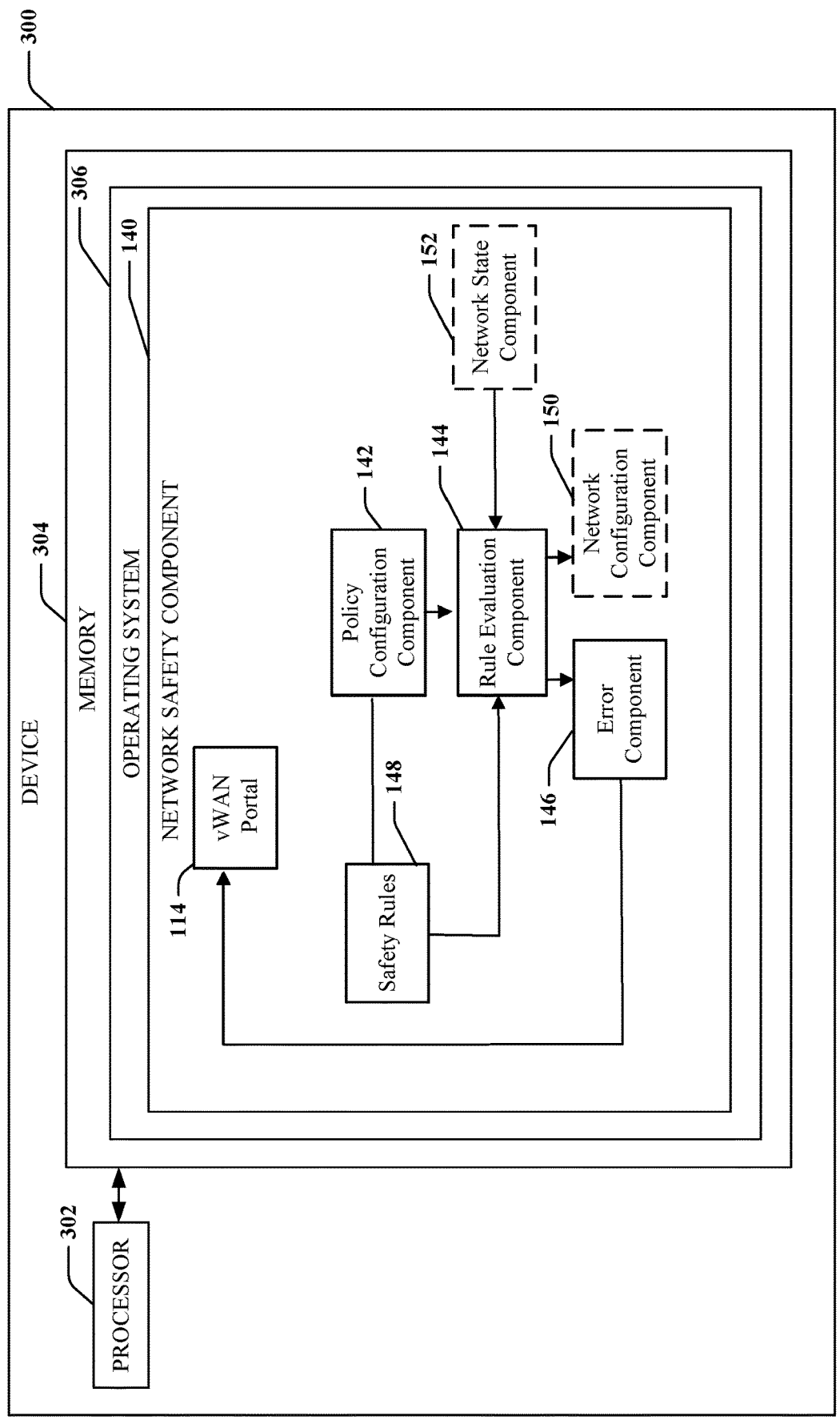
FIG. 3 is a schematic diagram of an example of a device for enforcing safety rules for a vWAN, in accordance with aspects described herein.
Figure 4:
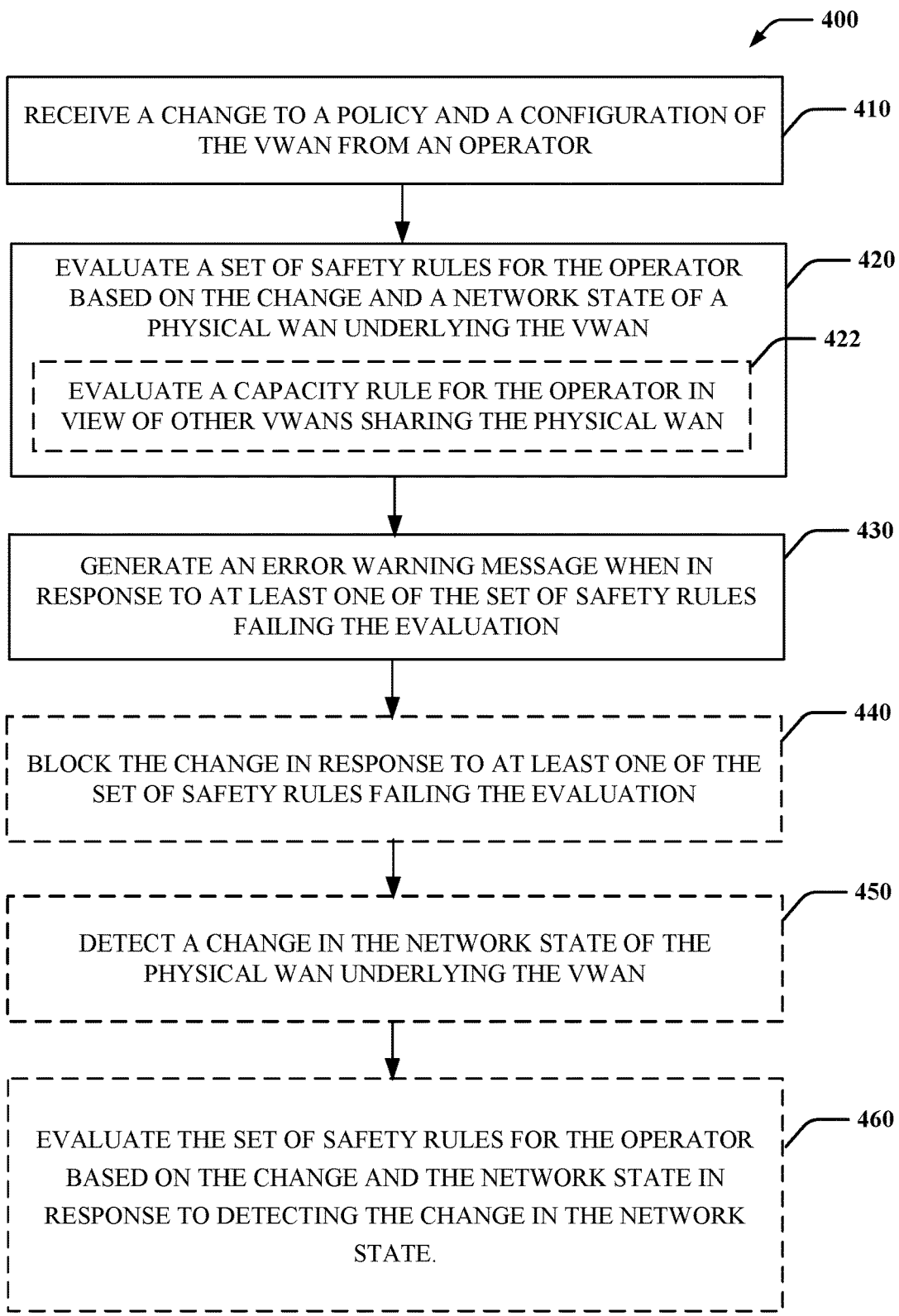
FIG. 4 is a flow diagram of an example of a method of enforcing safety rules for a vWAN, in accordance with aspects described herein.

Turning now to FIGS. 1-5, examples are depicted with reference to one or more components and one or more methods that may perform the actions or operations described herein, where components and/or actions/operations in dashed line may be optional. Although the operations described below in FIG. 4 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 is a conceptual diagram 100 of an example of an architecture for a vWAN 120. The vWAN 120 may be connected to an operator network 110. The vWAN 120 may be implemented by an underlying WAN 160. A network safety component 140 may enforce safety rules when a network operator of the operator network 110 makes changes to a configuration or policy of the vWAN 120.

The operator network 110 may be a customer of the vWAN 120. The operator network 110 may be, for example, a radio access network (RAN) including a user device 104 and a base station 102. The operator network 110 may be connected to the vWAN 120 at a boundary 112 to expand the operator network 110. For instance, the vWAN 120 may provide a connection to $3^{rd}$ party services 128 that are hosted on the vWAN or the vWAN 120 may host services of the operator network 110. Additionally, the vWAN 120 may include virtual network entities (e.g., virtual network entity 124), which may represent a presence in a geographic region where the operator network 110 does not have physical resources. In some implementations, the vWAN 120 may include a virtualized radio access network (vRAN). For instance, the vWAN 120 may perform functions of a core network or may include virtualized base stations that perform RAN processing.

A vWAN operator may provide vWAN portal 114 to a network operator. The vWAN portal 114 may include a representation of the vWAN 120. For instance, the representation of the vWAN 120 may include virtual network entities 122, 124, and 126 and virtual connections 132, 134, and 136. The virtual network entities 122, 124, and 126 may each be associated with a respective geographic location 190, 192, 194, 196. The geographic locations 190, 192, 194, 196 may be of different sizes. For example, a geographic location may be a city, a state, a region, or a country. In some implementations, a geographic location is associated with a point of presence. In the illustrated example, the virtual network entities 122, 124, and 126 are labelled West, East, and South, respectively. The virtual network entity 122 may be associated with a geographic location 192, the virtual network entity 124 may be associated with a geographic location 194, and the virtual network entity 126 may be associated with a geographic location 196.

The vWAN 120 may be implemented by an underlying WAN 160. In the underlying WAN 160, physical resources may be located within each geographic location corresponding to a virtual network entity. For example, the geographic location 192 associated with virtual network entity 122 may include physical resources 162, 164, and 166, the geographic location 194 associated with virtual network entity 124 may include physical resources 170 and 172, and the geographic location 196 associated with virtual network entity 126 may include physical resources 180 and 182. The geographic location 190 may represent a geographic location where the underlying WAN 160 does not have any physical resources. The vWAN 120 may not include a virtual network entity corresponding to the geographic location 190.

The virtual connections 132, 134, and 136 may represent connections between virtual network entities. The virtual connections 132, 134, and 136 may be implemented by the underlying WAN using any connections in the underlying WAN 160. For instance, in the illustrated example, the virtual connection 132 may not correspond to a direct physical connection between any resource in the geographic region associated with the virtual network entity 122 and any resource in the geographic region associated with the virtual network entity 124. That is, the illustrated connection 174 may not exist. Instead, the virtual connection 132 may represent any path from a physical resource within the geographic region associated with the virtual network entity 122 to any resource in the geographic region associated with the virtual network entity 124, including resources and/or connections within the geographic region associated with the virtual network entity 126.

In an aspect, the vWAN portal 114 allows the network operator to set a configuration and/or policies for the virtual network entities 122, 124, 126 or the virtual connections 132, 134, and 136. In some implementations, the configuration and/or policies may include match action rules that apply actions to traffic matching various criteria. For example, the network operator may host a service on the virtual network entity 124 and/or want to provide user devices 104 with access to a $3^{rd}$ party service 128 connected to the virtual network entity 124. The network operator may configure the virtual network entity 122 as an ingress point and specify a firewall and routing configuration for the virtual network entity 122. The network operator may also configure a policy of the virtual connection 132 to provide a desired level of service for traffic between the network entity 122 and the network entity 124.

The network safety component 140 may be configured with a set of safety rules 148 to ensure that changes to the configuration and/or policy of the vWAN do not violate higher level laws, regulations, or policies. In particular, the network safety component 140 may evaluate the safety rules 148 based on a configuration and/or policies of the vWAN and a network status of the underlying WAN 160. If at least one of the safety rules fails the evaluation, the network safety component 140 may generate an error message and/or block a change from taking place. The network safety component 140 may determine whether the change in configuration or policy, or a current network status, results in a violation of a set of safety rules 148.

The network safety component 140 may include a policy configuration component 142 that receives the change to the policy or configuration of the vWAN from a network operator of a network connected to the vWAN 120 (e.g., the operator network 110). The network safety component 140 includes a rule evaluation component 144 that evaluates the safety rules 148 for the operator based on the change and a network state of the underlying WAN 160. The network safety component 140 includes an error component 146 that generates an error message in response to at least one of the set of safety rules 148 failing the evaluation. In some implementations, the error component 146 may block the change in response to at least one of the set of safety rules 148 failing the evaluation.

In some implementations, the network safety component 140 may include a network configuration component 150. The network configuration component 150 may configure the underlying WAN 160 to implement the change if all of the safety rules 148 pass the evaluation. In some implementations, the network safety component 140 may include a network state component 152. The network state component 152 may monitor a state of the underlying WAN 160. For instance, the network state component 152 may detect when physical resources of the underlying WAN 160 are unavailable. The network state component 152 may provide network state information to the rule evaluation component 144. In some implementations, the network state component 152 may trigger an evaluation of the safety rules 148 in response to a change in the network state.

FIG. 2 is a diagram 200 of an example set of safety rules 148. In general, each safety rule may include executable code or a script including one or more conditions that may be evaluated based on a configuration and state of the underlying network. In an aspect, the vWAN operator may provide the set of safety rules 148 to the network operator via the vWAN portal 114. The vWAN portal 114 may describe the conditions for each rule without exposing the specific code or architecture of the underlying WAN 160.

In some implementations, the network operator may select which of the safety rules 148 the network safety component 140 should enforce. In some implementations, one or more of the safety rules may be mandatory. For example, the vWAN operator may require that safety rules to ensure compliance with applicable laws are evaluated or that safety rules to prevent network outages or damage are evaluated. In some implementations, the network rules may include selectable parameters. For instance, a reliability rule may include a selectable number of failures. In some implementations, a network operator may request a customized rule. The vWAN operator may create the customized rule as a codelet or script and make the customized rule available to one or more network operators.

A reachability rule 210 may specify whether a first virtual network location is reachable from a second virtual network location for one or more classes of traffic. For example, a positive reachability rule 212 may specify that point A is reachable from point B by class C traffic. A network operator may specify a network entity 124 hosting a subscription service as point A, any ingress point as point B, and traffic from a class of user devices with a subscription as class C. The rule evaluation component 144 may check that each ingress point (e.g., virtual network entity 122) includes a resource (e.g., server 162) with a path to a resource (e.g., server 172) in the virtual network entity 124. The rule evaluation component 144 may further check that each node along the path is configured to forward traffic for the class C along the path.

As another example, a negative reachability rule 214 may specify that a point D is not reachable by a traffic class E. For instance, a network administration system hosted on a virtual network entity 126 is not reachable from traffic originating at a user device 104. The rule evaluation component 144 may check that connections to the virtual network entity 126 are configured to block traffic from user devices 104.

A correctness rule 220 may check that network parameters are valid. For example, the rule evaluation component 144 may check that configured entity names and addresses correspond to virtual or physical entities. As another example, a correctness rule 220 may check that all traffic is handled (e.g., default rules are defined).

A capacity rule 230 may check that the underlying WAN 160 can support a policy or configuration specified by the operator. Evaluation of a capacity rule may depend on a current network state and/or a configuration of other vWANs sharing the underlying WAN 160. For instance, a policy for virtual connection 132 may specify a bandwidth and latency for traffic over the virtual connection. The capacity rule 230 may identify one or more paths within the underlying WAN 160 that support the requested latency. The capacity rule 230 may identify a total capacity of the identified paths and an allocated capacity for other vWANs. The capacity rule 230 may determine whether a remaining available capacity for the identified paths can satisfy the requested capacity.

A reliability rule 240 may check that a configuration can be expected to provide a specified availability (e.g., available 99.999% of the time) for a service or that the configuration of the service can tolerate a number of failed nodes. For example, the rule evaluation component 144 may evaluate a reliability rule 240 by determining a whether a number of alternative paths is greater than the number of failed nodes. As another example, the reliability rule may monitor metrics for the service and generate an error message when the specified reliability is not achieved.

A regulatory rule 250 may be based on a specific law or regulation of one or more geographic regions. A regulatory rule 250 may include one or more rules of other types. In some implementations, the underlying WAN 160 may span multiple geographic regions. The rule evaluation component 144 may evaluate a regulatory rule 250 for traffic originating within an applicable geographic region. For example, in the case of a law or regulation that specifies a geographic restriction on a type of traffic, a regulatory rule 250 may include a reachability rule 210 to enforce the geographic restriction.

A conflicts rule 260 may check that a configuration and/or policy for different virtual network entities or virtual connections do not conflict with each other. A conflicts rule 260 may allow resolution of conflicts based on priority. For example, if a policy for a virtual connection specifies a maximum latency and a routing configuration excludes a geographic location with a fastest path, the conflicts rule 260 may detect a conflict but allow resolution based on a higher priority of the routing configuration.

FIG. 3 is a schematic diagram of an example of a device 300 (e.g., a computing device) for providing enforcement of safety rules in a vWAN. The device 300 may be referred to as a network orchestrator. The device 300 may be implemented on a physical resource within the underlying WAN 160. For instance, the device 300 may be implemented at the server 180. The device 300 may communicate with a network operator via a portal, which may be accessed from outside the underlying WAN 160 (e.g., via a website). For example, the device 300 may generate the vWAN portal 114 as an externally accessible website.

In an example, device 300 can include a processor 302 and/or memory 304 configured to execute or store instructions or other parameters related to providing an operating system 306, which can execute one or more applications or processes, such as, but not limited to, at least one of the network safety component 140 for enforcing safety rules based on configuration, policy, or network state. For example, processor 302 and memory 304 may be separate components communicatively coupled by a bus (e.g., on a motherboard or other portion of a computing device, on an integrated circuit, such as a system on a chip (SoC), etc.), components integrated within one another (e.g., processor 302 can include the memory 304 as an on-board component), and/or the like. Memory 304 may store instructions, parameters, data structures, etc. for use/execution by processor 302 to perform functions described herein.

In an example, the network safety component 140 may include one or more of a policy configuration component 142 for receiving a change to a policy or configuration of the vWAN from an operator of a network connected to the vWAN, a rule evaluation component 144 for evaluating a set of safety rules for the operator based on the change and a network state of a physical WAN underlying the vWAN, and an error component for generating an error message in response to at least one of the set of safety rules failing the evaluation. The network safety component 140 may store the safety rues 148. The network safety component 140 may optionally include one or more of a network configuration component 150 or network state component 152.

The policy configuration component 142 may be configured to receive a change to a policy or configuration of the vWAN from an operator of a network connected to the vWAN. Example policies that may be set by the operator include routing policy, performance policy, peering policy, geographic policy, or and hardware constraints. For example, a routing policy may specify a route including a specific virtual connection to use or a specific virtual network entity as a destination for a class of traffic. A performance policy may specify a traffic tier or a specific performance metric to be targeted for a class of traffic. A peering policy may specify a peering between an operator network and a vWAN network entity. A geographic policy may specify geographic regions for a traffic class. In particular, a geographic policy may specify geographic regions (e.g., countries) that traffic is not allowed to traverse. A hardware constraint may specify restrictions on hardware. For example, a hardware constraint may specify that equipment from a vendor with known security vulnerabilities is not to be used. A configuration may refer to actions to be performed at a virtual network entity 122, 124, 126. For example, a configuration may include services hosted on the virtual network entity, a firewall configuration, or a routing configuration.

The rule evaluation component 144 may be configured to evaluate a set of safety rules for the operator based on the change and a network state of a physical WAN underlying the vWAN. For example, where the safety rules 148 include executable code including logical conditions, the rule evaluation component 144 may execute each configured rule. During execution, the rules may access the received policy or configuration information and channel state information (e.g., from the channel state component 152). In some implementations, the rule evaluation component 144 may utilize a satisfiability modulo theory (SMT) solver to evaluate a rule. For example, the rule evaluation component 144 may translate conditions of the rule into SMT formulas to determine of the conditions can be satisfied given a current network state. In some implementations, the rule evaluation component 144 may utilize a binary decision diagram (BDD) or branching program. In some implementations, the rule evaluation component 144 may output a pass or fail for each safety rule 148.

The error component 146 may be configured to generate an error message in response to at least one of the set of safety rules failing the evaluation. For example, the error component 146 may generate an error message at the vWAN portal 114 to display the error message to the network operator. Accordingly, the network operator may further change the policy or configuration in response to the error message in order to satisfy the safety rules 148. In some implementations, the error component 146 may be configured to block the change in response to at least one of the set of safety rules failing the evaluation. For example, the error component 146 may forward the policy or configuration to the network configuration component 150 in response to all of the safety rules 148 passing, but may not forward the policy or configuration to the network configuration component 150 in response to one or more of the safety rules 148 failing. In some implementations, each safety rule 148 may indicate whether to generate an error message and/or whether to block implementation if the safety rule fails.

The network configuration component 150 may be configured to translate the configuration or policy for the virtualized wide area network into a configuration of the underlying WAN 160. For example, the network configuration component 150 may configure individual computing resources within the underlying WAN 160. For instance, the network configuration component 150 may set routing tables on routers or configure services to be performed on servers. In some implementations, the network configuration component 150 may include a network optimizer that attempts to reduce a cost metric while satisfying performance requirements. In an aspect, the network configuration component 150 may trigger the rule evaluation component 144 to evaluate the safety rules 148 based on a specific configuration of the underlying WAN 160 or a change thereto.

The network state component 152 may be configured to detect a change in the network state of the physical WAN 160 underlying the vWAN 120. For example, the network state component 152 may receive reports of failures of physical resources. As another example, the network state component 152 may track performance metrics and determine a degraded network state in response to degraded performance metrics. The network state component 152 may provide network state information (e.g., availability status of physical resources) to the rule evaluation component 144.

FIG. 4 is a flow diagram of an example of a method 400 for evaluating a configuration and policies for a vWAN based on a set of safety rules. For example, the method 400 can be performed by a device 300 and/or one or more components thereof to configure the underlying WAN 160 based on a change in configuration and policies of the vWAN 120 selected by an operator.

At block 410, the method 400 includes receiving a change to a policy or configuration of the vWAN from an operator. The vWAN includes a plurality of virtual network entities associated with geographic locations and virtual connections between the virtual network entities. In an example, the policy configuration component 142, e.g., in conjunction with processor 302, memory 304, and operating system 306, can receive a change to a policy or configuration of the vWAN 120 from an operator (e.g., via the vWAN portal 114). The vWAN includes a plurality of virtual network entities 122, 124, 126 associated with geographic locations 192, 194, 196, and virtual connections 132, 134, 136 between the virtual network entities.

At block 420, the method 400 includes evaluating a set of safety rules for the operator based on the change and a network state of a physical WAN underlying the vWAN. In an example, the rule evaluation component 144, e.g., in conjunction with processor 302, memory 304, and operating system 306, can evaluating a set of safety rules 148 for the operator based on the change and a network state of a physical WAN 160 underlying the vWAN 120. For instance, at sub-block 422, the block 420 may include evaluating a capacity rule for the operator in view of other vWANs sharing the physical WAN. For instance, the rule evaluation component 144 may assume that capacity allocated to the other vWANs is not available to satisfy the capacity rule.

At block 430, the method 400 includes generating an error message in response to at least one of the set of safety rules failing the evaluation. In an example, the error component 146, e.g., in conjunction with processor 302, memory 304, and operating system 306, can generate the error message in response to at least one of the set of safety rules 148 failing the evaluation in block 420. For example, the error component 146 may present the error message via the vWAN portal 114. For example, the error component 146 may present the error message in response to the operator submitting the change to the configuration or policy. In some implementations, where multiple changes are submitted at once, the error component 146 may identify particular configurations or policies and the corresponding safety rules that failed the evaluation. In some implementations, the error message may be included in a log file.

At block 440, the method 400 may optionally include blocking the change in response to at least one of the set of safety rules failing the evaluation. In an example, the error component 146, e.g., in conjunction with processor 302, memory 304, and operating system 306, can block the change in response to at least one of the set of safety rules failing the evaluation. For instance, the error component 146 may block the specific change in configuration or policy that caused the evaluation of the safety rule to fail. In some implementations, where multiple changes are submitted at once, the error component 146 may block all of the changes.

At block 450, the method 400 may optionally include detecting a change in the network state of the physical WAN underlying the vWAN. In an example, the network state component 152, e.g., in conjunction with processor 302, memory 304, and operating system 306, can detect the change in the network state of the physical WAN underlying the vWAN. Example changes in the network state may include unavailability of a physical resource. For instance, a server 162 may be affected by a power outage or a physical connection may be damaged. In some implementations, the network state may include a load level at one or more physical resources. The load level may account for other vWANs sharing the physical WAN.

At block 460, the method 400 may optionally include evaluating the set of safety rules for the operator based on the policy and configuration for the operator and the network state in response to detecting the change in the network state. The evaluation in block 460 may be similar to the evaluation in block 420, but with a different network state. For example, the rule evaluation component 144, e.g., in conjunction with processor 302, memory 304, and operating system 306, can evaluating the set of safety rules 148 for the operator based on the policy and configuration for the operator and the network state of the underlying WAN 160.

Figure 5:
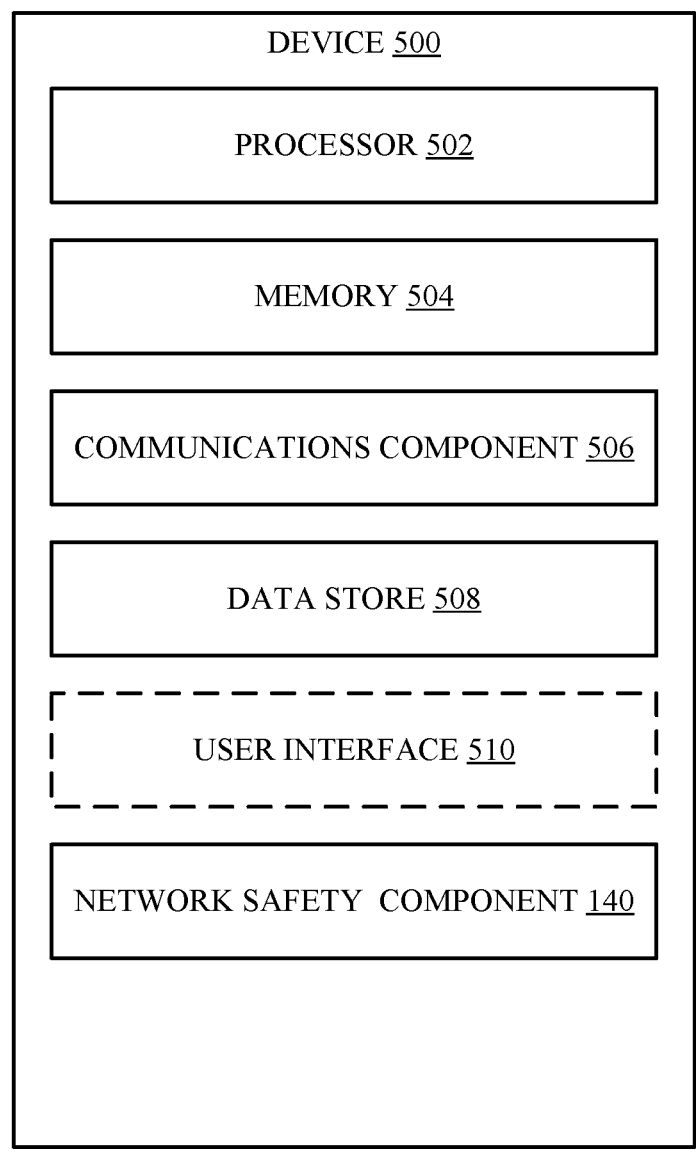
FIG. 5 is a schematic diagram of an example of a device for performing functions described herein, in accordance with aspects described herein.

FIG. 5 illustrates an example of a device 500 including additional optional component details as those shown in FIG. 3. In one aspect, device 500 may include processor 502, which may be similar to processor 302 for carrying out processing functions associated with one or more of components and functions described herein. Processor 302 can include a single or multiple set of processors or multi-core processors. Moreover, processor 502 can be implemented as an integrated processing system and/or a distributed processing system.

Device 500 may further include memory 504, which may be similar to memory 304 such as for storing local versions of operating systems (or components thereof) and/or applications being executed by processor 502, such as network safety component 140, policy configuration component 142, rule evaluation component 144, error component 146, etc. Memory 504 can include a type of memory usable by a computer, such as random access memory (RAM), read only memory (ROM), tapes, magnetic discs, optical discs, volatile memory, non-volatile memory, and any combination thereof.

Further, device 500 may include a communications component 506 that provides for establishing and maintaining communications with one or more other devices, parties, entities, etc. utilizing hardware, software, and services as described herein. Communications component 506 may carry communications between components on device 500, as well as between device 500 and external devices, such as devices located across a communications network and/or devices serially or locally connected to device 500. For example, communications component 506 may include one or more buses, and may further include transmit chain components and receive chain components associated with a wireless or wired transmitter and receiver, respectively, operable for interfacing with external devices.

Additionally, device 500 may include a data store 508, which can be any suitable combination of hardware and/or software, that provides for mass storage of information, databases, and programs employed in connection with aspects described herein. For example, data store 508 may be or may include a data repository for operating systems (or components thereof), applications, related parameters, etc. that are not currently being executed by processor 502. In addition, data store 508 may be a data repository for safety rules 148 storing configured rules for each operator and/or a data repository for network state component 152 storing a status or configuration for each physical resource.

Device 500 may optionally include a user interface component 510 operable to receive inputs from a user of device 500 and further operable to generate outputs for presentation to the user. User interface component 510 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 510 may include one or more output devices, including but not limited to a display, a speaker, a haptic feedback mechanism, a printer, any other mechanism capable of presenting an output to a user, or any combination thereof.

Device 500 may additionally include network safety component 140 for enforcing safety rules, as described herein.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An apparatus for enforcing safety rules on a virtualized wide area network (vWAN), comprising:
   a memory storing one or more instructions for managing the vWAN, wherein the vWAN includes a plurality of virtual network entities associated with geographic locations and virtual connections between the virtual network entities, each virtual connection associated with a policy to provide a desired level of service for traffic between a pair of virtual network entities; and
   at least one processor coupled to the memory and configured to execute the instructions, wherein the at least one processor is configured to:
      receive a change to the policy and a configuration of a virtual connection between a first virtual entity in the vWAN and a second virtual entity in the vWAN from an operator of a network connected to the vWAN;
      evaluate a set of safety rules for the operator based on the change to the policy and the configuration of the virtual connection of the vWAN and a network state of a physical WAN underlying the vWAN to determine whether conditions of the safety rules can be satisfied given the policy, the configuration, and the network state, wherein the set of safety rules includes a reachability rule defining whether the first virtual entity in the vWAN can reach the second virtual entity in the vWAN according to the policy and the configuration of the virtual connection; and
      generate an error message in response to at least one of the set of safety rules failing the evaluation.

2. The apparatus of claim 1, wherein the at least one processor is configured to block the change in response to at least one of the set of safety rules failing the evaluation.

3. The apparatus of claim 1, wherein the policy or configuration is a match action rule.

4. The apparatus of claim 1, wherein the at least one processor is configured to:
   detect a change in the network state of the physical WAN underlying the vWAN; and
   evaluate the set of safety rules for the operator based on the policy and configuration for the operator and the network state in response to detecting the change in the network state.

5. The apparatus of claim 1, wherein the set of safety rules includes a negative reachability rule that prevents traffic originating in a first geographic location from entering a second geographic location.

6. The apparatus of claim 1, wherein the set of safety rules includes a capacity rule defining whether the physical WAN underlying the vWAN can support the policy and configuration of the vWAN.

7. The apparatus of claim 6, wherein evaluating the capacity rule includes evaluating the capacity rule for the operator in view of other vWANs sharing the physical WAN.

8. The apparatus of claim 1, wherein the set of safety rules include a first set of rules defining compliance with government regulations and a second set of rules defining operator selected rules.

9. The apparatus of claim 1, wherein the at least one processor is configured to receive a selection of the set of safety rules from the network operator.

10. A method of enforcing safety rules on a virtualized wide area network (vWAN), comprising:
    receiving a change to a policy and a configuration of a virtual connection between a first virtual entity in the vWAN and a second virtual entity in the vWAN from an operator of a network connected to the vWAN, wherein the vWAN includes a plurality of virtual network entities associated with geographic locations and virtual connections between the virtual network entities, each virtual connection associated with a respective policy to provide a desired level of service for traffic between a pair of virtual network entities;
    evaluating a set of safety rules for the operator based on the change to the policy and the configuration of the virtual connection of the vWAN and a network state of a physical WAN underlying the vWAN to determine whether conditions of the safety rules can be satisfied given the policy, the configuration, and the network state, wherein the set of safety rules includes a reachability rule defining whether the first virtual entity in the vWAN can reach the second virtual entity in the vWAN according to the policy and the configuration of the virtual connection; and
    generating an error message in response to at least one of the set of safety rules failing the evaluation.

11. The method of claim 10, further comprising blocking the change in response to at least one of the set of safety rules failing the evaluation.

12. The method of claim 10, wherein the policy or configuration is a match action rule.

13. The method of claim 10, further comprising:
    detecting a change in the network state of the physical WAN underlying the vWAN; and
    evaluating the set of safety rules for the operator based on the policy and configuration for the operator and the network state in response to detecting the change in the network state.

14. The method of claim 10, wherein the set of safety rules includes restrictions that prevent traffic originating in a first geographic location from entering a second geographic location.

15. The method of claim 10, wherein the set of safety rules includes capacity rules defining whether the physical WAN underlying the vWAN can support the policy and configuration of the vWAN.

16. The method of claim 15, wherein evaluating the capacity rules includes evaluating the capacity rules for the operator in view of other vWANs sharing the physical WAN.

17. The method of claim 10, wherein the set of safety rules include a first set of rules defining compliance with government regulations and a second set of rules defining operator rules.

18. A system for enforcing safety rules on a virtualized wide area network (vWAN), comprising:
    a wide area network (WAN) including a plurality of geographically distributed physical computing resources and connections there between; and
    a network orchestrator including a memory storing one or more parameters or instructions for managing the vWAN on the WAN and at least one processor coupled to the memory, wherein the vWAN includes a plurality of virtual network entities associated with geographic locations including the physical computing resources and virtual connections between the virtual network entities, each virtual connection associated with a policy to provide a desired level of service for traffic between a pair of virtual network entities, and wherein the at least one processor is configured to:

receive a change to the policy and a configuration of a virtual connection between a first virtual entity in the vWAN and a second virtual entity in the vWAN from an operator of a network connected to the vWAN;

evaluate a set of safety rules for the operator based on the change to the policy and the configuration of the virtual connection of the VWAN and a network state of the WAN underlying the vWAN to determine whether conditions of the safety rules can be satisfied given the policy, the configuration, and the network state, wherein the set of safety rules includes a reachability rule defining whether the first virtual entity in the vWAN can reach the second virtual entity in the vWAN according to the policy and the configuration of the virtual connection; and generate an error message in response to at least one of the set of safety rules failing the evaluation.

* * * * *